United States Patent
Takaoka et al.

(10) Patent No.: US 8,560,910 B2
(45) Date of Patent: Oct. 15, 2013

(54) WIRELESS COMMUNICATION DEVICE AND CIRCULAR BUFFER CONTROL METHOD

(75) Inventors: Shinsuke Takaoka, Kanagawa (JP); Kenichi Kuri, Kanagawa (JP); Seigo Nakao, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 762 days.

(21) Appl. No.: 12/680,162

(22) PCT Filed: Sep. 30, 2008

(86) PCT No.: PCT/JP2008/002732
§ 371 (c)(1),
(2), (4) Date: Mar. 29, 2010

(87) PCT Pub. No.: WO2009/044534
PCT Pub. Date: Apr. 9, 2009

(65) Prior Publication Data
US 2010/0199157 A1 Aug. 5, 2010

(30) Foreign Application Priority Data
Oct. 1, 2007 (JP) .................................. 2007-257762

(51) Int. Cl.
*H04L 29/14* (2006.01)

(52) U.S. Cl.
USPC .............. 714/752; 714/800; 710/52; 709/232

(58) Field of Classification Search
USPC .............. 714/752, 800; 709/233, 232; 710/52
See application file for complete search history.

(56) References Cited

U.S. PATENT DOCUMENTS 7,890,834 B2 * 2/2011 Blankenship et al. ........ 714/755

| 7,924,763 | B2 * | 4/2011 | Nimbalker et al. | 370/315 |
| 7,986,741 | B2 * | 7/2011 | Tsai et al. | 375/261 |
| 8,189,559 | B2 * | 5/2012 | Pi et al. | 370/351 |
| 8,225,165 | B2 * | 7/2012 | Zheng | 714/752 |
| 2002/0191643 | A1 | 12/2002 | Yun | |
| 2008/0313521 | A1 * | 12/2008 | Frederiksen et al. | 714/748 |
| 2010/0199157 | A1 * | 8/2010 | Takaoka et al. | 714/800 |

FOREIGN PATENT DOCUMENTS

JP 2002-359882 12/2002

OTHER PUBLICATIONS

International Search Report dated Dec. 16, 2008.
3GPP TSG RAN WG1 Meeting #50, "Redundancy version definition for DL-SCH," Samsung, R1-073563, Aug. 20-24, 2007, pp. 1-2.
3GPP TSG RAN WG1 Meeting #49bis, "An RV definition scheme with variable starting Positions," LG Electronics, R1-072865, Jun. 25-29, 2007, pp. 1-5.
3GPP TSG-RAN WG1#49bis, "Considerations of CBRM and HARQ Operations," Ericsson, R1-073030, pp. 1-4, Jun. 25, 2007.

(Continued)

*Primary Examiner* — Joseph Schell
(74) *Attorney, Agent, or Firm* — Dickinson Wright PLLC

(57) ABSTRACT

There is provided a wireless communication device capable of improving a decoding performance by using an optimal selection criterion for a start address and a read direction in a circular buffer. An interlacer (13) writes an interleaved and interlaced bit sequence into a circular buffer (14). An RV decision unit (109) decides the read start address and read direction of the circular buffer (14) based on the number of non-transmitted systematic bits, the number of non-transmitted important parity bits, and/or the number of non-transmitted unimportant parity bits. A read control unit (110) controls the read start address and read end address of the circular buffer (14). A read unit (15) is controlled by the read control unit (110) to continuously read encoded bits from the circular buffer (14).

7 Claims, 13 Drawing Sheets

| RV SELECTION CANDIDATE | | NUMBER OF SYSTEMATIC BITS YET TO BE TRANSMITTED | NUMBER OF CRITICAL PARITY BITS YET TO BE TRANSMITTED | NUMBER OF NON-CRITICAL PARITY BITS YET TO BE TRANSMITTED | |
|---|---|---|---|---|---|
| RV=0 | FORWARD DIRECTION | 0 | 0 | 0 | ... (1) |
| | BACKWARD DIRECTION | 2 | 1 | 2 | ... (2) |
| RV=1 | FORWARD DIRECTION | 0 | 0 | 0 | ... (3) |
| | BACKWARD DIRECTION | 0 | 0 | 0 | ... (4) |
| RV=2 | FORWARD DIRECTION | 0 | 2 | 3 | ... (5) |
| | BACKWARD DIRECTION | 0 | 0 | 0 | ... (6) |
| RV=3 | FORWARD DIRECTION | 0 | 1 | 4 | ... (7) |
| | BACKWARD DIRECTION | 0 | 1 | 4 | ... (8) |

(56) References Cited

OTHER PUBLICATIONS

3GPP TSG RAN WG1 Meeting #49bis, "An RV definition scheme with variable starting Positions," LG Electronics, R1-073200, Jun. 25-29, 2007, pp. 1-5.

Ericsson, ETRI, Freescale, ITRI, LGE, Motorola, Qualcomm, Samsung, ZTE, "Way forward on HARQ rate matching for LTE," R1-072604, Agenda item 7.5, May 7-11, 2007, pp. 1-6.

* cited by examiner

| RV SELECTION CANDIDATE | | SMALLEST NUMBER OF GAP BITS OR SMALLEST NUMBER OF OVERLAPPING BITS | |
|---|---|---|---|
| RV=0 | FORWARD DIRECTION | 9 | ··· (1) |
| | BACKWARD DIRECTION | 7 | ··· (2) |
| RV=1 | FORWARD DIRECTION | 4 | ··· (3) |
| | BACKWARD DIRECTION | 9 | ··· (4) |
| RV=2 | FORWARD DIRECTION | 5 | ··· (5) |
| | BACKWARD DIRECTION | 2 | ··· (6) |
| RV=3 | FORWARD DIRECTION | 6 | ··· (7) |
| | BACKWARD DIRECTION | 3 | ··· (8) |

FIG.6

| RV SELECTION CANDIDATE | | SMALLEST NUMBER OF GAP BITS OR SMALLEST NUMBER OF OVERLAPPING BITS | |
|---|---|---|---|
| RV=0 | FORWARD DIRECTION | 9 | ···(1) |
| | BACKWARD DIRECTION | 7 | ···(2) |
| RV=1 | FORWARD DIRECTION | 4 | ···(3) |
| | BACKWARD DIRECTION | 9 | ···(4) |
| RV=3 | FORWARD DIRECTION | 6 | ···(5) |
| | BACKWARD DIRECTION | 3 | ···(6) |

FIG.8

| RV SELECTION CANDIDATE | | NUMBER OF SYSTEMATIC BITS YET TO BE TRANSMITTED | NUMBER OF CRITICAL PARITY BITS YET TO BE TRANSMITTED | NUMBER OF NON-CRITICAL PARITY BITS YET TO BE TRANSMITTED | |
|---|---|---|---|---|---|
| RV=0 | FORWARD DIRECTION | 0 | 0 | 0 | ...(1) |
| | BACKWARD DIRECTION | 2 | 1 | 2 | ...(2) |
| RV=1 | FORWARD DIRECTION | 0 | 0 | 0 | ...(3) |
| | BACKWARD DIRECTION | 0 | 0 | 0 | ...(4) |
| RV=2 | FORWARD DIRECTION | 0 | 2 | 3 | ...(5) |
| | BACKWARD DIRECTION | 0 | 0 | 0 | ...(6) |
| RV=3 | FORWARD DIRECTION | 0 | 1 | 4 | ...(7) |
| | BACKWARD DIRECTION | 0 | 1 | 4 | ...(8) |

FIG.10

WIRELESS COMMUNICATION DEVICE AND CIRCULAR BUFFER CONTROL METHOD

The present invention relates to a radio communication apparatus and a circular buffer control method.

BACKGROUND ART

Extended commercial services of third generation mobile communication represented by HSDPA/HSUPA have been started and multimedia communication such as data communication and video communication has been increasing in popularity. Therefore, data sizes are expected to increase even more in the future, and growing demands for higher data rates are also anticipated. Then, technical studies are underway to realize a higher data rate of maximum downlink transmission rate of 100 Mbps.

To realize this higher data rate, as a rate matching technique of forming a transmission bit sequence of a desired coding rate or a desired coding length from a bit sequence subject to error correction coding (encoded bit sequence) with a given minimum coding rate (a mother rate), rate matching using a circular buffer (circular buffer-based rate matching) is proposed. By making a buffer to which an encoded bit sequence is written a circular (cyclic)-structure buffer, the addresses upon forming a transmission bit sequence of a desired coding rate or a desired coding length are easily managed, and complexity upon installing a buffer is reduced. Further, with a circular buffer-based rate matching, rate matching is performed on a per divided code block basis, so that it is possible to process a plurality of code blocks in parallel.

Furthermore, studies are conducted for HARQ (Hybrid Automatic Repeat reQuest) control used by combining circular buffer-based rate matching (see Non-Patent Document 1). With this HARQ control, as shown in FIG. 1, a circular buffer to which encoded bit sequences are written is divided into a plurality of buffers such that each head address of a divided buffer are associated with each RV (Redundancy Version) index in HARQ. Then, a transmission bit sequence fulfilling a desired coding rate (or a desired coding length) is consecutively read from a read start address (i.e. starting position of reading) calculated based on the selected RV index.

However, the coding rate or the coding length of an encoded bit sequence is usually determined based on a CQI (Channel Quality Indicator), and therefore changes over time. Further, the buffer size of the divided buffers (i.e. divided buffer size) is preset and does not change. Therefore, a transmission bit sequence and the divided buffer size rarely match. Accordingly, as shown in FIG. 1, a gap or overlap is produced between transmission RVs, to deteriorate decoding performance on the receiving side. In the example shown in FIG. 1, a gap is produced between the first transmission RV and a second transmission RV and between the second transmission RV and a third transmission RV, and an overlap is produced between the third transmission RV and the first transmission RV.

To prevent gaps and overlaps between RVs, studies are conducted for HARQ control that defines a read direction (a forward direction or backward direction) from a circular buffer, in addition to a read start address from a circular buffer. The number of conventional RVs has been four, taking into account the tradeoff between an overhead and rate matching performance, and therefore two control information bits have been conventionally prepared for reporting the RV configuration to the receiving side. Then, with the technique disclosed in Non-Patent Document 2, among two control information bits, one bit is used for information about a read start address and the other bit is used for information about the read direction. Consequently, according to Non-Patent Document 2, two read start addresses, a read start address as RV=0 and read start address as RV=1, are defined. Then, Non-Patent Document 2 discloses a concrete example, assume that both the first transmission RV and a second transmission RV are RV=0, upon the first transmission, reading a transmission bit sequence in the forward direction from the read start address, RV=0, and upon a second transmission, reading a transmission bit sequence in the backward direction from the read start address, RV=0.

Non-Patent Document 1: R1-072604, "Way forward on HARQ rate matching for LTE," 3GPP TSG RAN WG1 #49, Kobe, Japan, May 7-11, 2007

Non-Patent Document 2: R1-073563, "Redundancy version definition for DL-SCH," 3GPP TSG RAN WG1 #50, Athens, Aug. 20-24, 2007

DISCLOSURE OF INVENTION

Problems to be Solved by the Invention

However, Non-Patent Document 2 only discloses the above concrete example, and does not disclose selection criteria about read start addresses and read directions. Particularly, Non-Patent Document 2, including the above concrete example, discloses neither read start addresses nor read directions of when an RV is transmitted three times or more.

It is therefore an object of the present invention to provide a radio communication apparatus and an RV reading method in a circular buffer that enable decoding performance to improve using optimal selection criteria about read start addresses and read directions.

Means for Solving the Problem

The radio communication apparatus of the present invention adopts the configuration including: a circular buffer in which a bit sequence comprised of systematic bits and parity bits is written; a selection section that selects one of a plurality of selection candidates formed with read start address candidates and read direction candidates of the circular buffer, based on at least one of the number of systematic bits yet to be transmitted, the number of critical parity bits yet to be transmitted and the number of non-critical parity bits yet to be transmitted; and a control section that controls a read start address and a read end address in the circular buffer according to the selected selection candidate.

The circular buffer control method of the present invention includes the steps of: selecting one of a plurality of selection candidates formed with read start address candidates and read direction candidates of a circular buffer in which a bit sequence comprised of systematic bits and parity bits is written, based on at least one of the number of systematic bits yet to be transmitted, the number of critical parity bits yet to be transmitted and the number of non-critical parity bits yet to be transmitted; and controlling a read start address and a read end address in the circular buffer according to the selected selection candidate.

Advantageous Effects of Invention

According to the present invention, it is possible to improve decoding performance using optimal selection criteria about read start addresses and read directions.

BRIEF DESCRIPTION OF DRAWINGS

FIG. 6 shows RV selection candidates (example 1-1) according to Embodiment 1 of the present invention;

FIG. 8 shows RV selection candidates (example 1-2) according to Embodiment 1 of the present invention;

FIG. 10 shows the RV selection candidates (example 2-1) according to Embodiment 2 of the present invention;

BEST MODE FOR CARRYING OUT THE INVENTION

Now, embodiments of the present invention will be described in detail with reference to the accompanying drawings.

(Embodiment 1)

Figure 1:
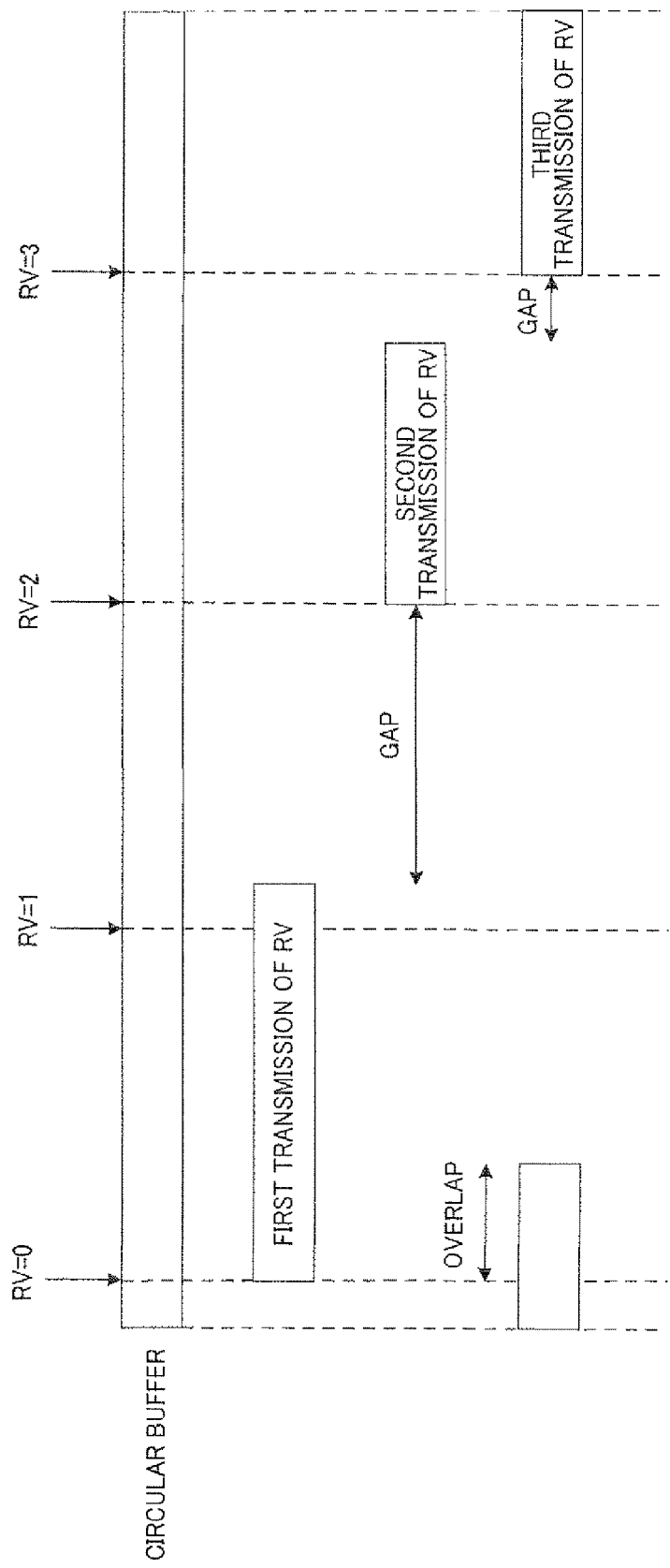
FIG. 1 illustrates a conventional circular buffer.
Figure 2:
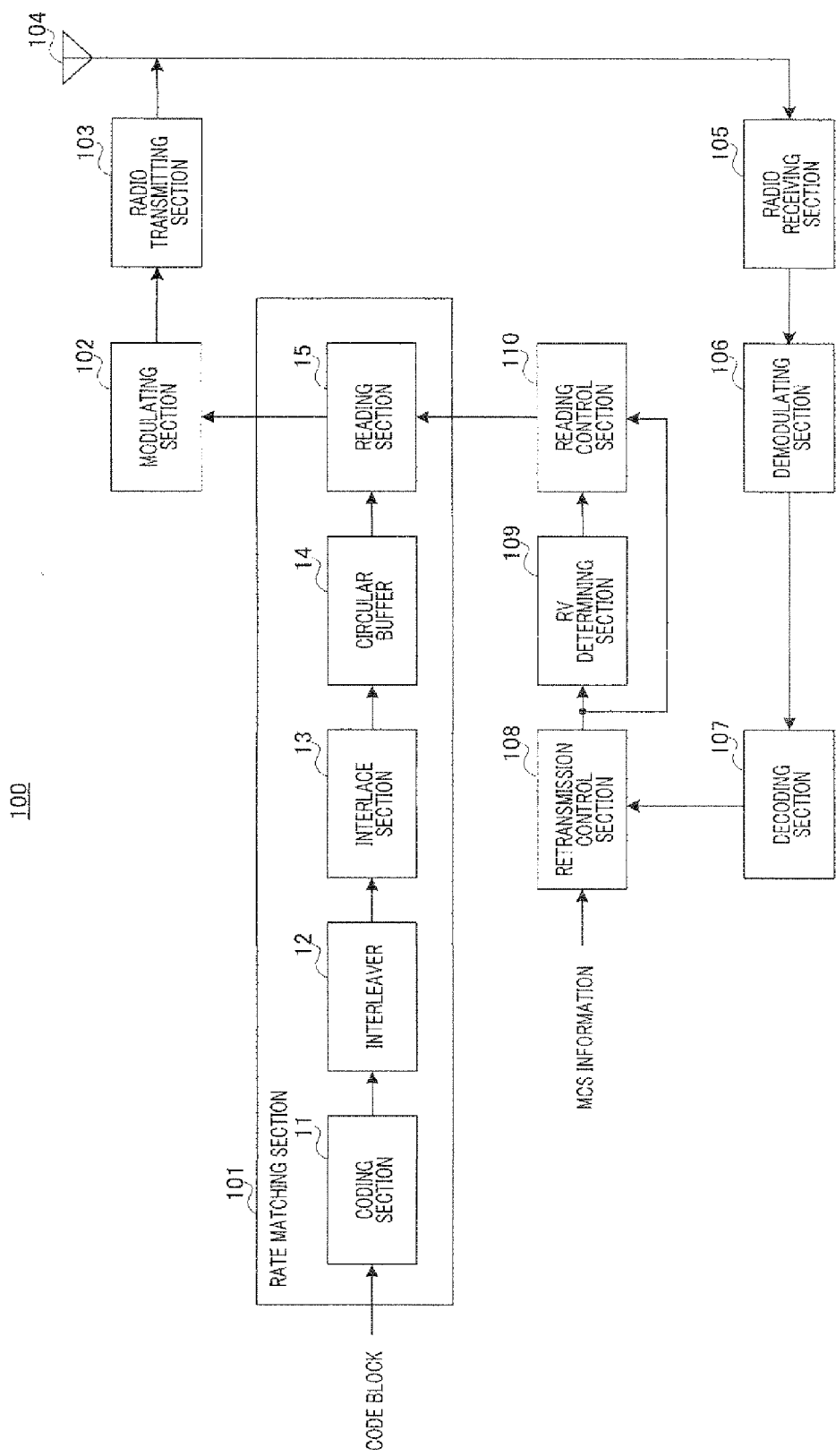
FIG. 2 is a block diagram showing the configuration of a radio communication apparatus according to Embodiment 1 of the present invention.

FIG. 2 shows the configuration of radio communication apparatus 100 according to the present embodiment.

In radio communication apparatus 100 shown in FIG. 2, rate matching section 101 is configured with coding section 11, interleaver 12, interlace section 13, circular buffer 14 and reading section 15.

Coding section 11 receives as input in order a plurality of code blocks generated by dividing a transport block.

Coding section 11 performs error correction coding on a information bit sequence in a code block using turbo coding, and outputs an encoded bit sequence composed of systematic bits and parity bits, to interleaver 12. Here, the coding rate (mother rate) of coding section 11 is ⅓. Therefore, one information bit is encoded to one systematic bit (S bit) and two parity bits (P1 bit and P2 bit).

Interleaver 12 interleaves the encoded bit sequence per S bit sequence, P1 bit sequence and P2 bit sequence, and outputs the interleaved S bit sequence, P1 bit sequence and P2 bit sequence to interlace section 13.

Interlace section 13 performs interlace processing on the interleaved P1 bit sequence and P2 bit sequence, and writes the interleaved S bit sequence and the interleaved and interlaced P1 bit sequence and P2 bit sequence to circular buffer 14 consecutively in order.

According to a read start address and a read end address received as input from reading control section 110, reading section 15 reads encoded bits consecutively from circular buffer 14, and outputs the read encoded bit sequence as a transmission bit sequence to modulating section 102.

Figure 3:
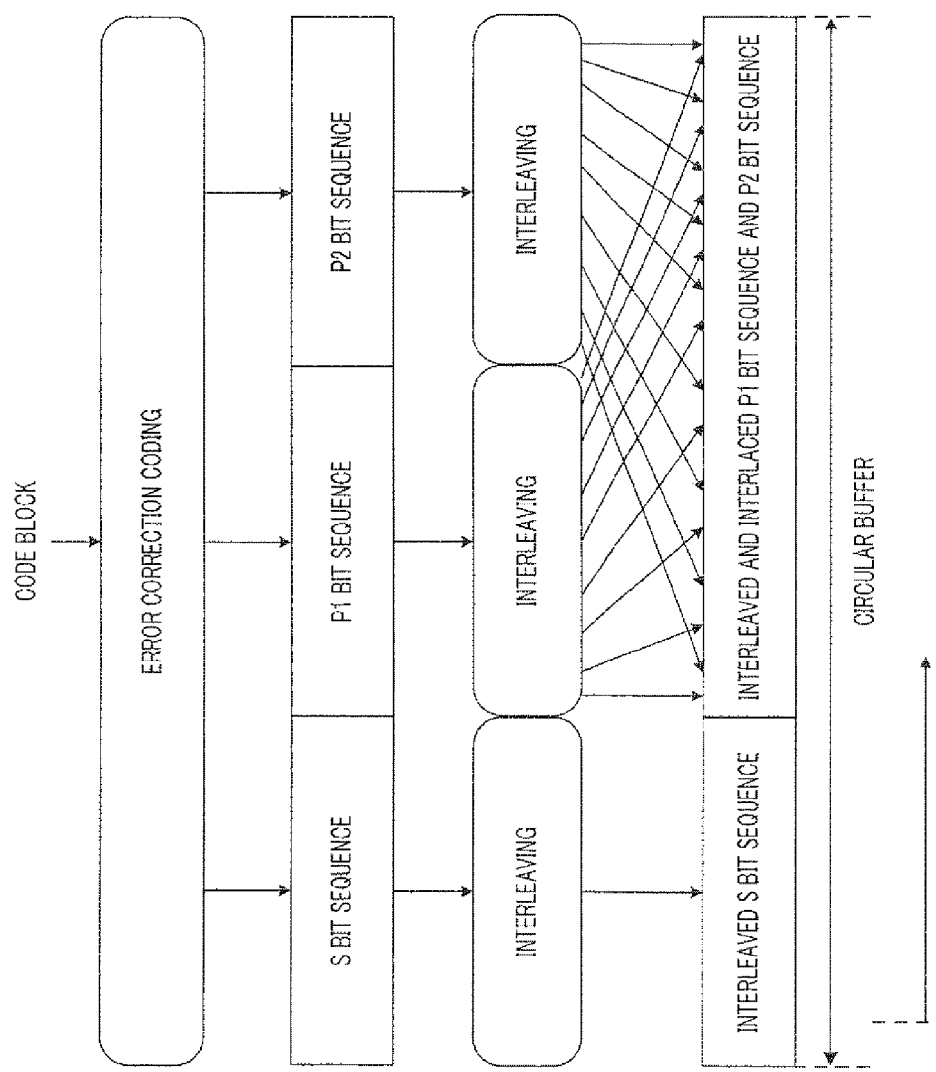
FIG. 3 illustrates a summary of rate matching process according to Embodiment 1 of the present invention.

Therefore, the summary of rate matching processing performed in rate matching section 101 is shown in FIG. 3.

Modulating section 102 modulates a transmission bit sequence, to generate a data symbol, and outputs the generate data symbol to radio transmitting section 103.

Radio transmitting section 103 performs transmitting processing including D/A conversion, amplification and up-conversion on the data symbol, and transmits the data symbol after transmitting processing to a radio communication apparatus on the receiving side from antenna 104.

Meanwhile, radio receiving section 105 receives a response signal such as an ACK (Acknowledgment) or NACK (Negative Acknowledgment) transmitted from a radio communication apparatus of the receiving side through antenna 104, and performs receiving processing such as down-conversion and A/D conversion on the response signal.

Demodulating section 106 demodulates the response signal after receiving processing and outputs the demodulated response signal to decoding section 107.

Decoding section 107 decodes the demodulated response signal and outputs the decoded response signal to retransmission control section 108.

Retransmission control section 108 performs retransmission control of an RV. Retransmission control section 108 calculates the sequence length of a retransmission bit sequence (i.e. the retransmission bit sequence length) according to MCS (Modulation and Coding Scheme) information, that is, according to information indicating the modulation scheme and coding rate of a transmission bit sequence, and outputs the calculated sequence length to RV determining section 109 and reading control section 110. Further, retransmission control section 108 decides whether or not there is a retransmission RV based on the content of the response signal (i.e. ACK or NACK), and outputs the decision result to RV determining section 109.

RV determining section 109 determines a read start address and a read direction of the RV in circular buffer 14 based on the decision result in retransmission control section 108. Upon the first transmission of the RV, RV determining section 109 outputs a predetermined read start address and read direction to reading control section 110. On the other hand, upon a second and subsequent transmissions of the RV, that is, upon a retransmission of the RV, RV determining section 109 finds the smallest number of gap bits or the smallest number of overlapping bits between the transmitted bit sequence and the retransmission bit sequence on a per RV selection candidate basis, as selection criteria for RV selection candidates (selection candidates for the read start address and selection candidates for the read direction), using the retransmission bit sequence length received as input from retransmission control section 108. Then, by comparing the smallest number of found gap bits and the smallest number of found overlapping bits between the RV selection candidates, RV determining section 109 determines the read start address of retransmission RV (i.e. RV index) and the read direction, and outputs the determined read start address (i.e. RV index) and the determined read direction to reading control section 110.

Reading control section 110 controls a read start address and a read end address of circular buffer 14. Reading control section 110 calculates a read end address using the read start address (i.e. RV index) and the read direction received as input from RV determining section 109 and the retransmission bit sequence length received as input from retransmission control section 108, and outputs the calculated read end address together with the read start address, to reading section 15.

Next, determining a read start address (i.e. RV index) and a read direction will be explained using concrete examples.

EXAMPLE 1-1

FIGS. 4 to 7

With the present embodiment, a retransmission RV is configured using the read start address and the read direction where the smallest number of gap bits or the smallest number of overlapping bits with a transmitted bit sequence is a minimum among a plurality of RV selection candidates.

There are two read directions, the forward direction and the backward direction, and therefore, assuming that the number of read start addresses (i.e. the number of RVs) is Np, the number of RV selection candidates is 2Np. Accordingly, upon each transmission, one retransmission RV is selected among 2Np RV selection candidates.

Then, first, the smallest number of gap bits or the smallest number of overlapping bits are found on a per RV selection candidate basis. As for each RV selection candidate, a smaller gap or a smaller overlap among gaps or overlaps placed before and after an RV selection candidate is made the smallest gap or the smallest overlap.

Figure 4:
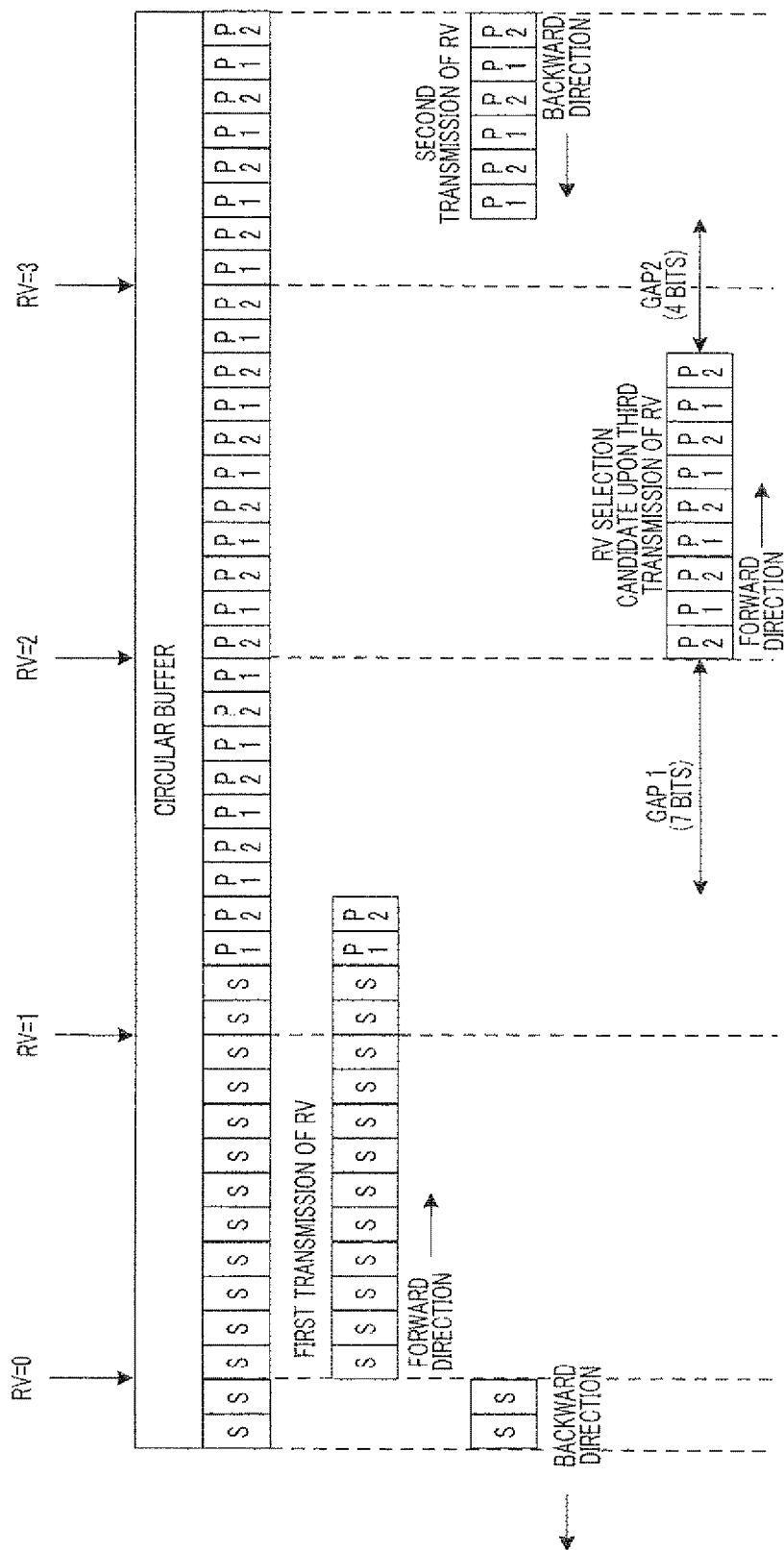
FIG. 4 shows the smallest number of gap bits according to Embodiment 1 of the present invention.

For example, as shown in FIG. 4, in the RV selection candidate of a third transmission (the retransmission sequence length=9 bits), when the read start address is RV=2 and the read direction is the forward direction, gap 1 of 7 bits is produced in the front and gap 2 of 4 bits is produced in the rear. Therefore, the smallest number of gap bits in this RV selection candidate is 4 bits.

Figure 5:
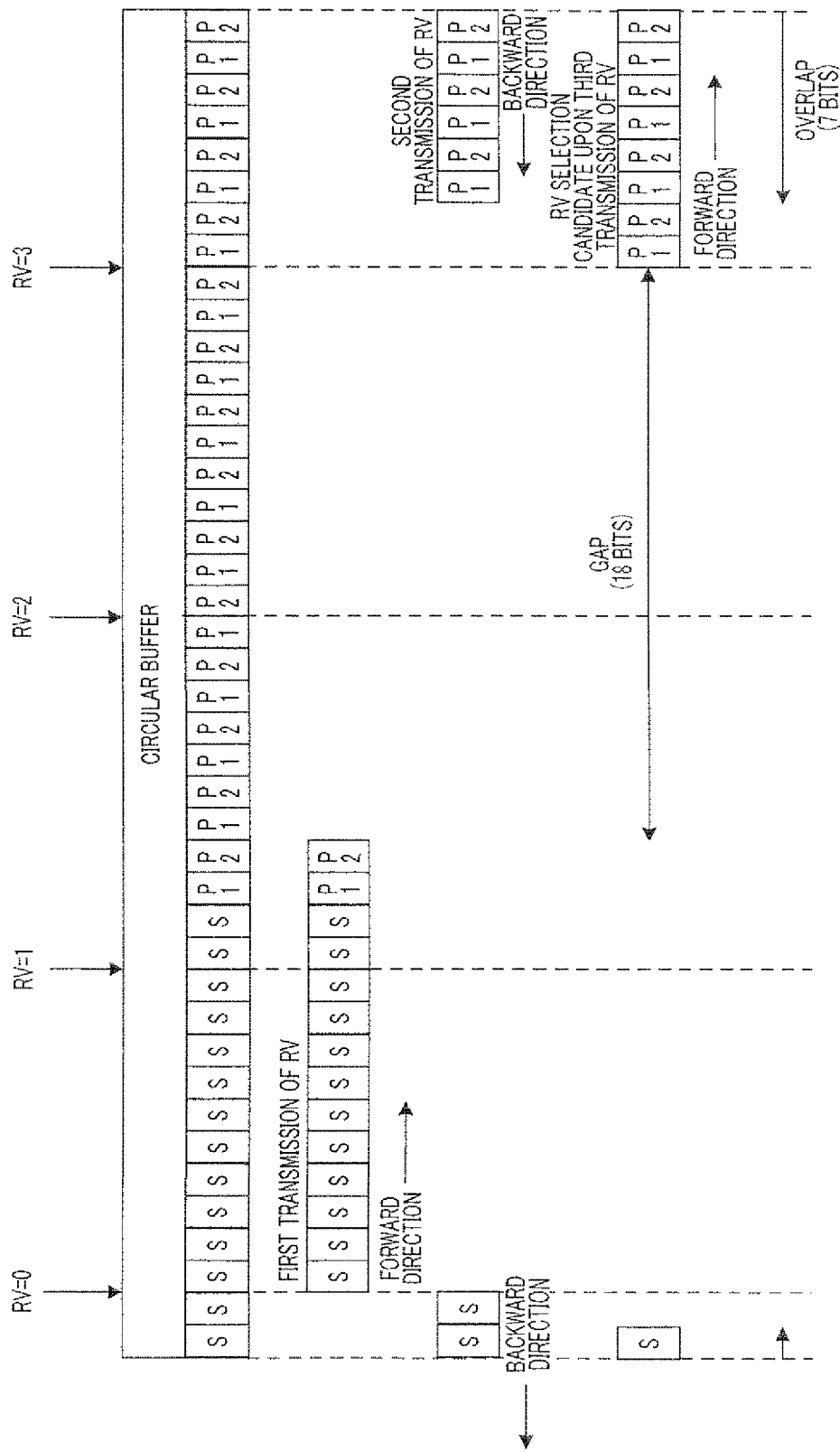
FIG. 5 shows the smallest number of overlapping bits according to Embodiment 1 of the present invention.

Further, as shown in FIG. 5, in the RV selection candidate of a third transmission (the retransmission sequence length=9 bits) if the read start address is RV=3 and the read direction is the forward direction, an 18-bit gap is produced in the front and a 7-bit overlap is produced in the rear. Therefore, the smallest number of overlapping bits in this RV selection candidate is 7 bits.

Figure 7:
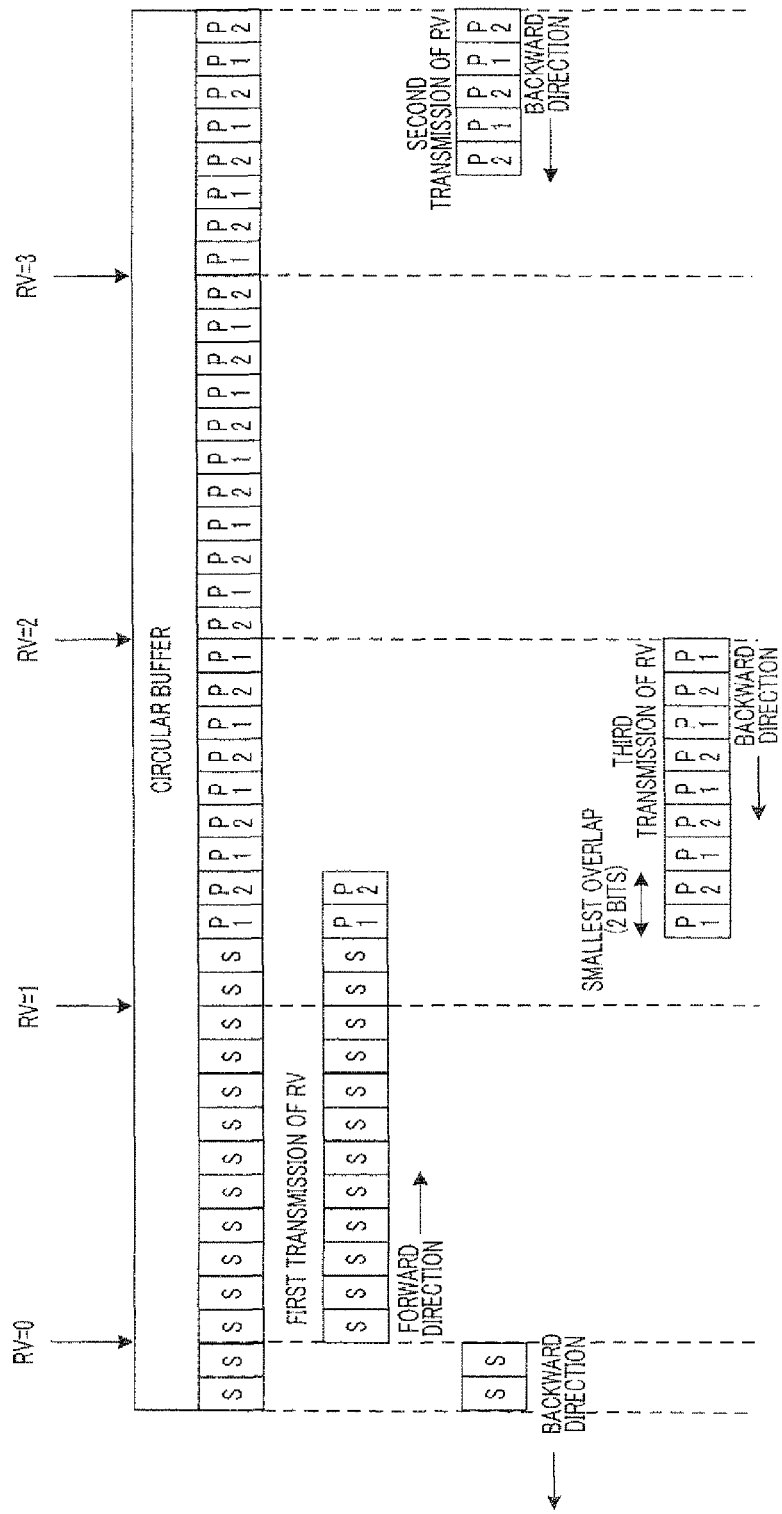
FIG. 7 shows a configuration of retransmission RVs (example 1-1) according to Embodiment 1 of the present invention.

FIG. 6 shows a concrete example of the smallest numbers of gap bits and the smallest numbers of overlapping bits in eight RV selection candidates 1 to 8 (retransmission bit sequence length=9 bits) upon a third transmission when Np=4. As shown in FIG. 7, the concrete example shown in FIG. 6 is the case where, upon the first transmission, the read start address is RV=0, the read direction is the forward direction, and the bit sequence length is 14 bits, where, upon a second transmission, the read start address is RV=0, the read direction is the backward direction, and the retransmission bit sequence length is 8, and where the retransmission bit sequence length is 9 bits upon a third transmission.

When the smallest numbers of gap bits or the smallest numbers of overlapping bits are compared among eight RV selection candidates 1 to 8 shown in FIG. 6, the smallest value in those candidates is 2 bits. Therefore, in the concrete example shown in FIG. 6, the read start address (RV index) and the read direction of the retransmission RV are determined to be RV=2 and the backward direction, respectively. The retransmission bit sequence length of the RV selection candidate shown in FIG. 6 is 9 bits, so that the address subtracting 9 bits from the address of RV=2 is the read end address. Consequently, according to the present example, upon a third transmission, as shown in FIG. 7, the retransmission RV is configured with encoded bits of 9 bits backward from the address of RV=2.

When there are a plurality of RV selection candidates that have the same smallest value of the smallest number of gap bits or the smallest number of overlapping bits, any RV selection candidate may be selected. For example, in this case, an RV selection candidate of the greatest RV index or an RV selection candidate of the smallest RV index may be selected among those plurality of RV selection candidates.

In this way, according to the present embodiment, taking into account of continuity and overlap with the transmitted bit sequence, a retransmission RV where gaps or overlaps with a transmitted bit sequence are a minimum is configured, so that it is possible to improve decoding performance on the receiving side and improve error rate performance upon a retransmission.

EXAMPLE 1-2

FIG. 8

With the present example, in the above example 1-1, the read start address of the retransmission RV is limited to a read start address of a transmitted bit sequence and a read start address neighboring the read start address.

The read start address upon the first transmission and the read start address upon a second transmission are both RV=0 in the above FIG. 7, and therefore, among four, RV=0, 1, 2 and 3, the read start address upon a third transmission is limited to three, RV=0 and, RV=1 and RV=3 that neighbor RV=0. Accordingly, the eight RV selection candidates 1 to 8 shown in the above FIG. 6 are limited to the six RV selection candidates 1 to 6 shown in FIG. 8.

Then, similar to the above example 1-1, upon comparing the smallest numbers of gap bits and the smallest numbers of overlapping bits among the six RV selection candidates 1 to 6 shown in FIG. 8, the smallest value in those candidates is 3 bits. Consequently, in a concrete example shown in FIG. 8, the read start address (i.e. RV index) and the read direction of the retransmission RV are determined to be RV=3 and the backward direction, respectively. Similar to the above example 1-1, the retransmission bit sequence length of the RV selection candidate shown in FIG. 8 is 9 bits, so that the address subtracting 9 bits from the address of RV=3 is the read end address. Consequently, according to the present example, upon a third transmission, the retransmission RV is configured with encoded bits of 9 bits backward from the address of RV=3.

In this way, according to the present example, RV selection candidates are limited, so that it is possible to reduce the amount of calculation for calculating and comparing the smallest numbers of gap bits or the smallest numbers of overlapping bits.

EXAMPLE 1-3

Although the smallest number of gap bits and the smallest number of overlapping bits are the same, the degree of influence of a gap on decoding performance differs from the degree of influence of an overlap on decoding performance.

Then, with the present example, weights are assigned to the smallest number of gap bits and the smallest number of overlapping bits in the above example 1-1. That is, with the present example, the smallest number of gap bits in the above example 1-1 is multiplied by weighting coefficient $\alpha$, and the smallest number of overlapping bits in the above example 1-1 is multiplied by weighting coefficient $\beta$, where $\alpha+\beta=1$.

By this means, it is possible to balance the influence on decoding performance between the smallest number of gap bits and the smallest number of overlapping bits. For example, to improve the SNR or SINR of a transmitted bit sequence, $\beta$ may only be increased beyond $\alpha$.

EXAMPLE 1-4

With the present embodiment, in the example 1-3, when an effective coding rate before a retransmission is higher than threshold value $x_{th}$, $\alpha$ is increased beyond $\beta$.

Generally, it is known that, when error correction coding having strong error correction capacity such as turbo coding is used, the error rate upon a retransmission can be reduced by reducing the effective coding rate by retransmitting a different bit sequence from a transmitted bit sequence, rather than by retransmitting the same bit sequence as a transmitted bit sequence.

Therefore, by setting $\alpha > \gamma$ when a coding rate before a retransmission is higher than threshold value $x_{th}$, it is possible to preferentially transmit encoded bits yet to be transmitted, so that it is possible to improve error rate performance while reducing the coding rate after retransmission.

(Embodiment 2)

Studies are underway to puncture any systematic bits upon the first transmission. When any systematic bits are punctured, critical parity bits and non-critical parity bits are produced. Critical parity bits refer to parity bits having significant influence on decoding performance on the receiving side, and non-critical parity bits refer to parity bits having little influence on decoding performance on the receiving side. Therefore, decoding performance varies depending on whether or not there are critical parity bits, so that, to improve error rate performance, critical parity bits should be transmitted more preferentially than non-critical parity bits.

Then, with the present embodiment, in the case where systematic bits are punctured upon the first transmission, a retransmission RV that includes more systematic bits yet to be transmitted and more critical systematic bits yet to be transmitted is configured.

Explanation will be given using FIG. 2 in only differing the radio communication apparatus according to the present embodiment from the radio communication apparatus according to the above Embodiment 1.

With the present embodiment, upon a second and subsequent transmissions of the RV, that is, upon a retransmission of the RV, RV determining section 109 finds the number of systematic bits yet to be transmitted, the number of critical parity bits yet to be transmitted and the number of non-critical parity bits yet to be transmitted included in RV selection candidates, on a per RV selection candidate basis, as selection criteria for RV selection candidates (selection candidates for the read start address and selection candidates for the read direction), using the retransmission bit sequence length received as input from retransmission control section 108. Then, by comparing the numbers of systematic bits yet to be transmitted, the numbers of critical parity bits yet to be transmitted and the numbers of non-critical parity bits yet to be transmitted after calculation between the RV selection candidates, RV determining section 109 determines the read start address of retransmission RV (i.e. RV index) and the read direction, and outputs the determined read start address (i.e. RV index) and the determined read direction to reading control section 110.

Next, determining a read start address (i.e. RV index) and a read direction will be explained using concrete examples.

EXAMPLE 2-1

Figure 9:
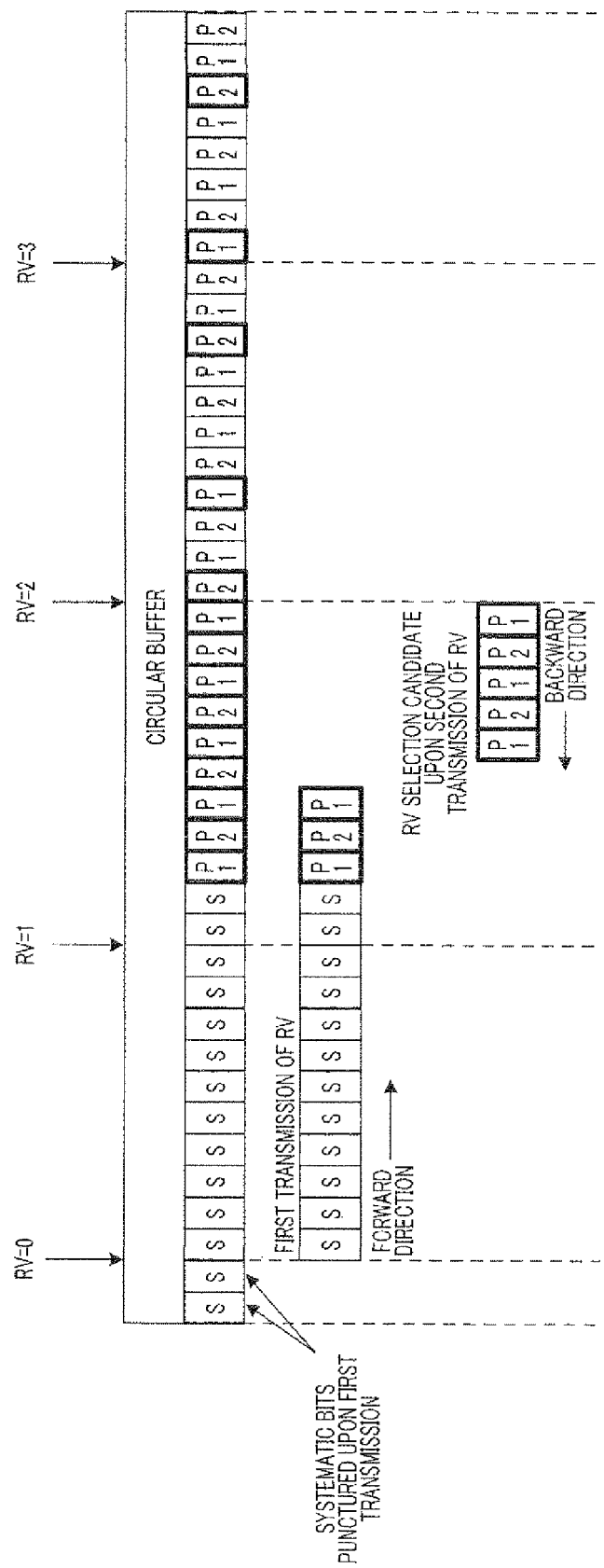
FIG. 9 shows a configuration of retransmission RVs (example 2-1) according to Embodiment 2 of the present invention.

FIGS. 9 and 10

There are two read directions, the forward direction and the backward direction, and therefore, assuming that the number of read start addresses (i.e. the number of RVs) is Np, the number of RV selection candidates is 2Np. Accordingly, upon each transmission, one retransmission RV is selected among 2Np RV selection candidates.

Then, first, the number of systematic bits yet to be transmitted, the number of critical parity bits yet to be transmitted and the number of non-critical parity bits yet to be transmitted are found on a per RV selection candidate basis. For example, as shown in FIG. 9, in the RV selection candidate of a second transmission (the retransmission sequence length=5 bits), when the read start address is RV=2 and the read direction is the backward direction, the number of systematic bits yet to be transmitted=0, the number of critical parity bits yet to be transmitted=5 and the number of non-critical parity bits yet to be transmitted=0. In FIG. 9, the parity bits surrounded with the bold lines in P1 and P2 are critical parity bits.

FIG. 10 shows a concrete example of the number of systematic bits yet to be transmitted, the number of critical parity bits yet to be transmitted and the number of non-critical parity bits yet to be transmitted in the eight RV selection candidates 1 to 8 (retransmission bit sequence length=5 bits) upon third transmission when Np=4. As shown in FIG. 9, a concrete example shown in FIG. 10 is the case where, upon the first transmission, the read start address is RV=0, the read direction is the forward direction, and the bit sequence length is 15 bits, and where, upon a second transmission, the retransmission bit sequence length is 5 bits.

Upon comparing the numbers of critical parity bits yet to be transmitted among the eight RV selection candidates 1 to 8 shown in the above FIG. 10, the RV selection candidate of the greatest number of critical parity bits yet to be transmitted is RV selection candidate 5. Consequently, in a concrete example shown in FIG. 10, the read start address (i.e. RV index) and the read direction of the retransmission RV are determined to be RV=2 and the forward direction, respectively. The retransmission bit sequence length of the RV selection candidate shown in FIG. 10 is 5 bits, so that the address adding 5 bits to the address of RV=2 is the read end address. Therefore, according to the present example, upon a third transmission, as shown in FIG. 9, the retransmission RV is configured with encoded bits of 5 bits forward from the address of RV=2.

An RV selection candidate in which the number of systematic bits yet to be transmitted is greater than the number of non-critical parity bits may be selected, and an RV selection candidate in which the sum of the number of systematic bits yet to be transmitted and the number of critical parity bits yet to be transmitted is greater than the number of non-critical parity bits may be selected.

Further, when there are a plurality of RV selection candidates that have the same number of bits to be comparison target, any RV selection candidate may be selected. For example, in this case, an RV selection candidate of the greatest RV index or an RV selection candidate of the smallest RV index may be selected among those plurality of RV selection candidates.

In this way, according to the present embodiment, when any systematic bits are punctured upon the first transmission, a retransmission RV including more critical parity bits or more systematic bits significantly contributing to the improvement of decoding performance is able to be configured, so that it is possible to improve decoding performance on the receiving side and improve error rate performance upon a retransmission.

EXAMPLE 2-2

When an effective coding rate after a retransmission is higher than a threshold value, critical parity bits significantly contribute to improvement of decoding performance than systematic bits.

Then, with the present example, when an effective coding rate after a retransmission is higher than a threshold value, an RV selection candidate in which the number of critical parity bits yet to be transmitted is greater than the number of systematic bits yet to be transmitted, is selected.

Upon comparing the numbers of systematic bits yet to be transmitted and the numbers of critical parity bits yet to be transmitted among the eight RV selection candidates 1 to 8 shown in the above FIG. 10, the RV selection candidates in which the number of critical parity bits yet to be transmitted is greater than the number of systematic bits yet to be transmitted, are RV selection candidates 5, 7 and 8. Further, the RV selection candidate in which the number of critical parity bits yet to be transmitted is greatest among RV selection candidates 5, 7 and 8, is RV selection candidate 5. Therefore, with the concrete example shown in the above FIG. 10, when the effective coding rate after a retransmission is higher than a threshold value, the read start address (i.e. RV index) and the read direction of the retransmission RV are determined to be RV=2 and the forward direction. The retransmission bit sequence length of the RV selection candidate shown in FIG. 10 is 5 bits, so that the address adding 5 bits to the address of RV=2 is the read end address. Therefore, according to the present example, when an effective coding rate after a retransmission is higher than a threshold value, upon a third transmission, the retransmission RV is configured with encoded bits of 5 bits forward from the address of RV=2.

Consequently, according to the present example, when the effective coding rate after a retransmission is high, it is possible to improve error rate performance upon a retransmission.

EXAMPLE 2-3

When an effective coding rate after a retransmission is lower than a threshold value, systematic bits significantly contribute to improvement of decoding performance than critical parity bits.

Then, with the present example, when an effective coding rate after a retransmission is lower than a threshold value, an RV selection candidate in which the number of systematic bits yet to be transmitted is greater than the number of critical parity bits yet to be transmitted is selected.

Upon comparing the numbers of systematic bits yet to be transmitted and the numbers of critical parity bits yet to be transmitted among the eight RV selection candidates 1 to 8 shown in the above FIG. 10, the RV selection candidate in which the number of systematic bits yet to be transmitted is greater than the number of critical parity bits yet to be transmitted, is RV selection candidate 2. Therefore, with the concrete example shown in the above FIG. 10, when the effective coding rate after a retransmission is lower than a threshold value, the read start address (i.e. RV index) and the read direction of the retransmission RV are determined to be RV=0 and the backward direction. The retransmission bit sequence length of the RV selection candidate shown in FIG. 10 is 5 bits, so that the address subtracting 5 bits from the address of RV=0 is the read end address. Therefore, according to the present example, when an effective coding rate after a retransmission is lower than a threshold value, upon a third transmission, the retransmission RV is configured with encoded bits of 5 bits backward from the address of RV=0.

Consequently, according to the present example, when the effective coding rate after a retransmission is low, it is possible to improve error rate performance upon a retransmission.

EXAMPLE 2-4

Figure 11:
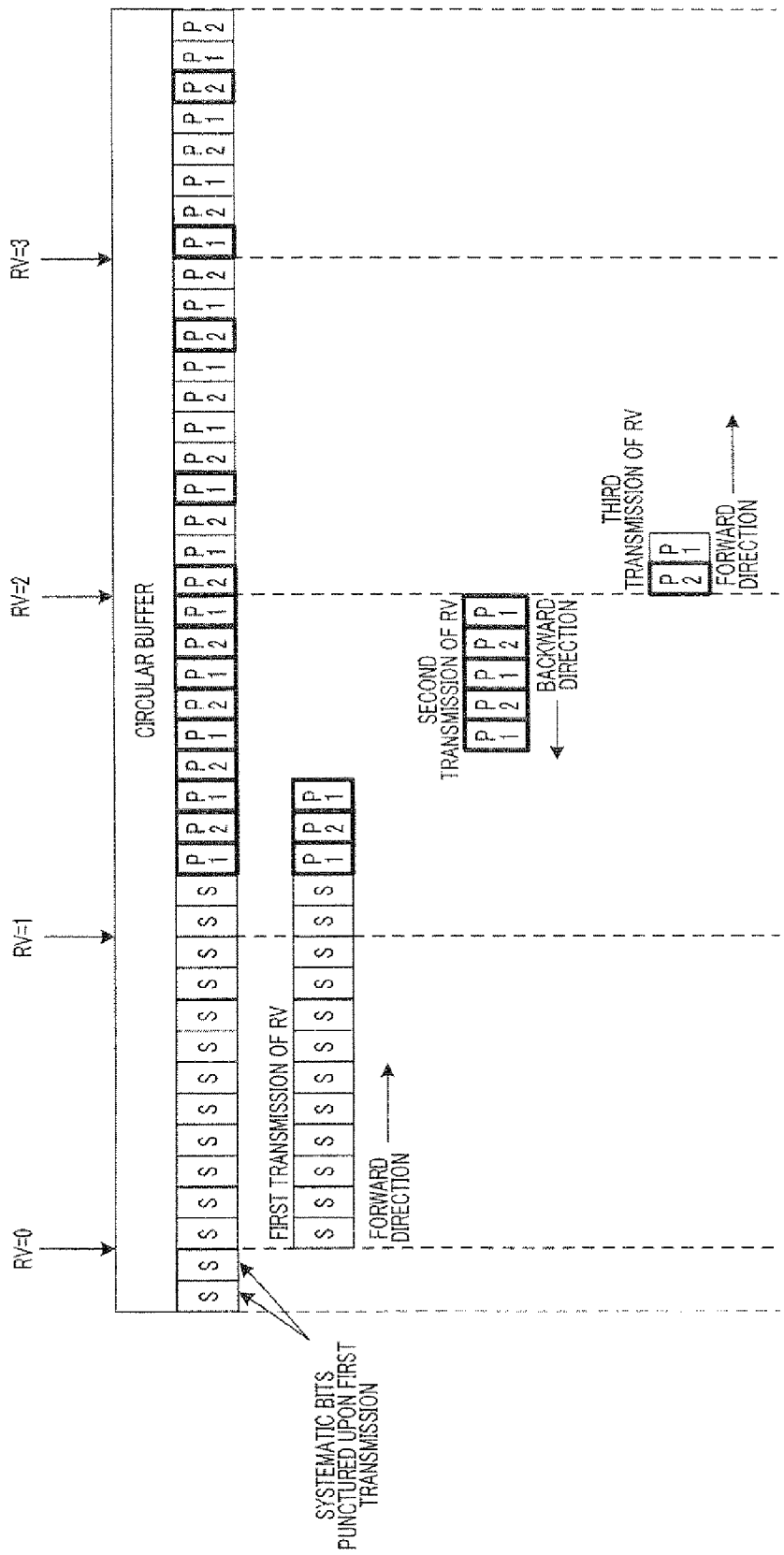
FIG. 11 shows read directions according to Embodiment 2 of the present invention (example 2-4, part 1)
Figure 12:
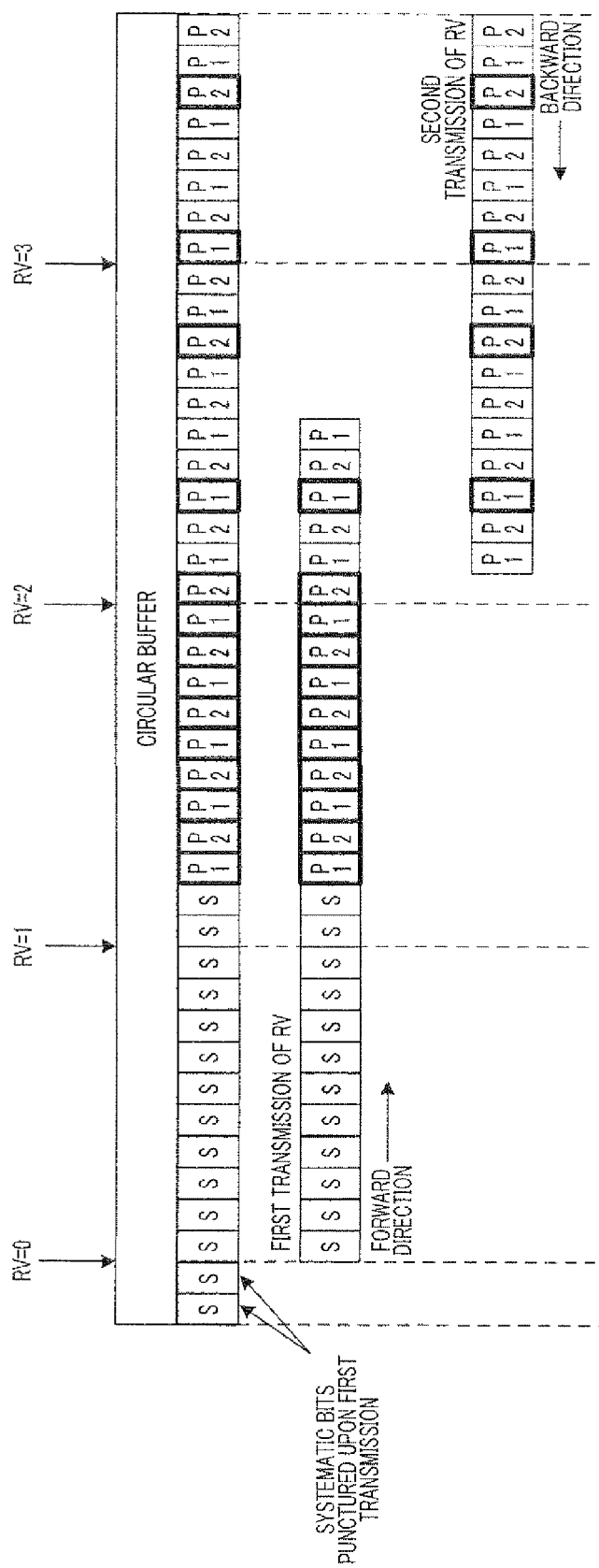
FIG. 12 shows the read directions according to Embodiment 2 of the present invention (example 2-4, part 2)

FIGS. 11 and 12

Normally, systematic bits are arranged consecutively in the head area of a circular buffer. Further, by modifying interleaving addresses of an interleaver a little, it is possible to arrange many critical parity bits to consecutive areas at the tail of a systematic bit sequence.

Therefore, in the above example 2-2, it is likely to select RV=2 at the read start address neighboring an area in which critical parity bits are present consecutively in the circular buffer. Further, the above example 2-3, it is likely to select RV=0 at the read start address neighboring an area in which systematic bits are present consecutively in the circular buffer.

Then, with the present example, as shown in FIGS. 11 and 12, the read direction is altered between the forward direction and the backward direction according to the number of times an RV is transmitted. That is, with the present embodiment, an RV selection candidate in which the read direction of the circular buffer can be altered between the forward direction and the backward direction according to the number of times an RV is transmitted, is selected.

By this means, it is not necessary to report a read direction of an RV to the RV receiving side, it is possible to reduce overhead due to report of a read direction.

EXAMPLE 2-5

FIG. 13

As described above, systematic bits are arranged consecutively in the top area of a circular buffer, so that, in the above example 2-3, it is likely that a read start address (RV index) is fixed upon a plurality of consecutive transmissions.

Figure 13:
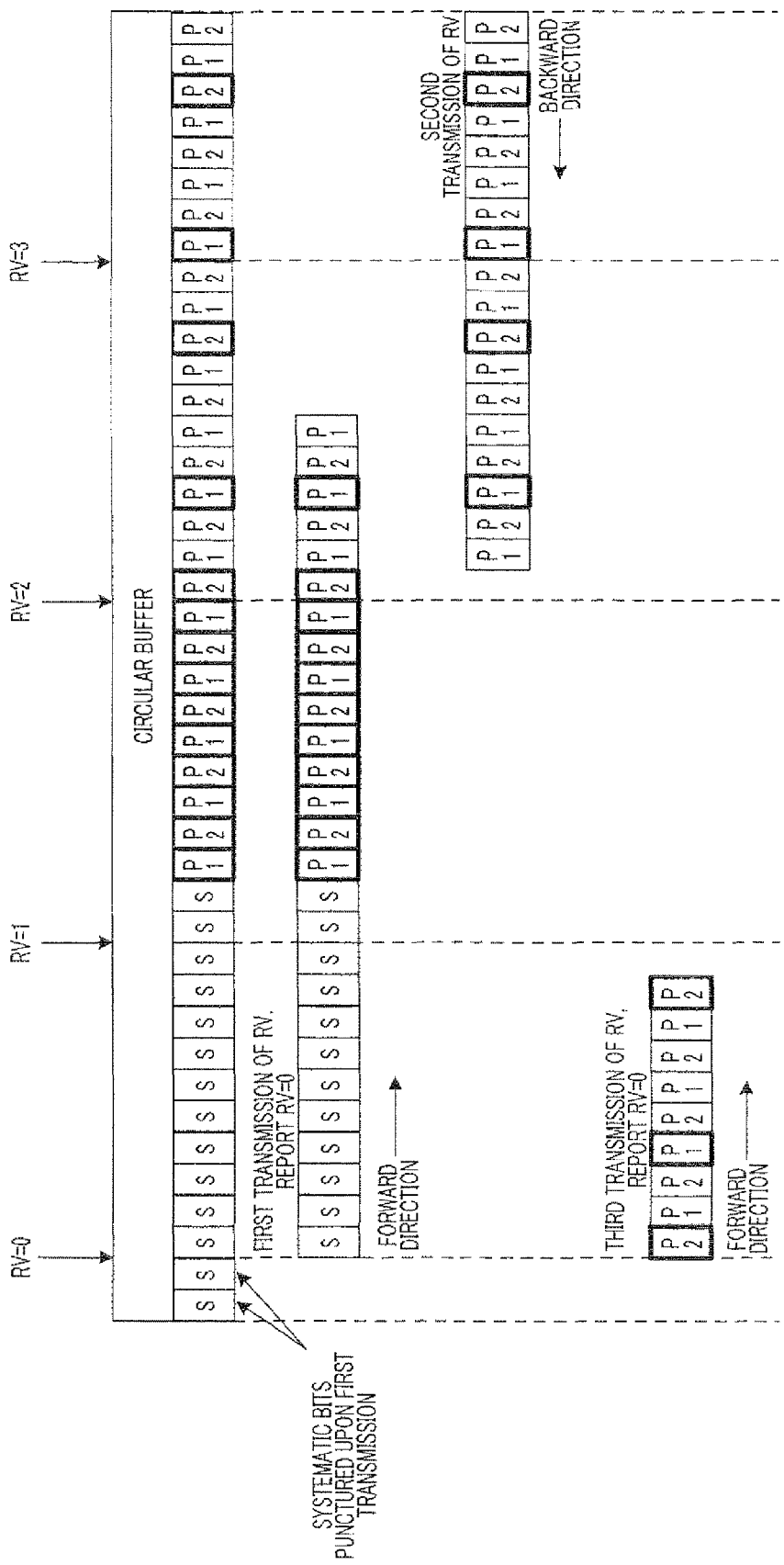
FIG. 13 shows reporting timings of RV indices according to Embodiment 2 of the present invention (example 2-5).

Then, with the present example, as shown in FIG. 13, only when the number of times an RV is transmitted is an odd number, the read start address (RV index) is reported to the receiving side. Consequently, with the present example, only upon odd-numbered transmissions, a read start address is changed, and, upon even-numbered transmissions, an RV is configured reusing the read start address that is used upon the previous odd-numbered transmissions. That is, according to the present example, upon even-numbered transmissions, a selection candidate having the same read start address as a read start address used upon the previous odd-numbered transmissions, is selected.

When a read start address upon the first transmission is fixed in advance, it is not necessary to report the read start address upon the first transmission.

By this means, reporting a read start address of an RV to the receiving side can be reduced, so that it is possible to reduce overhead by reporting a read start address.

(Embodiment 3)

Decoding performance on the receiving side changes by the mixed action of the smallest number of gap bits, the smallest number of overlapping bits, the number of systematic bits yet to be transmitted and the number of critical parity bits yet to be transmitted, shown in the above embodiments as selection criteria for RV selection candidates.

Then, with the present embodiment, the read start address (RV index) and the read direction are determined based on evaluation functions represented by using the smallest number of gap bits, the smallest number of overlapping bits, the number of systematic bits yet to be transmitted and the number of critical parity bits yet to be transmitted.

An example of evaluation function f is represented in Equation 1.

$$\begin{cases} f = a \times g(N_g) + b \times g'(N_0) + c \times g''(N_s) + d \times g'''(N_c) \\ g(N_g) = N_g \\ g'(N_0) = N_0 \\ g''(N_s) = 1/N_s \\ g'''(N_c) = 1/N_c \end{cases} \quad \text{(Equation 1)}$$

In equation 1, a to d are weighting coefficients, g(x) to g(x)''' are sub evaluation functions, Ng is the smallest number of gap bits, No is the smallest number of overlapping bits, Ns is the number of systematic bits yet to be transmitted and Nc is the number of critical parity bits yet to be transmitted.

The values a to d are set by taking into account of a coding rate, a sequence length of encoded bits, and whether or not systematic bits are punctured. Then, a retransmission RV is configured using a read start address and a read direction where the evaluation function value is a minimum.

In this way, according to the present embodiment, a read start address (RV index) and a read direction of a retransmission RV are determined using a plurality of selection criteria for RV selection candidates, so that it is possible to further improve decoding performance on the receiving side and further improve error rate performance upon a retransmission.

Embodiments of the present invention have been explained.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-257762, filed on Oct. 1, 2007, including the specification, drawings and abstract, is incorporated herein by reference in its entirety.

INDUSTRIAL APPLICABILITY

The present invention is applicable to, for example, mobile communication systems.

The invention claimed is:

1. A radio communication apparatus comprising:
a circular buffer in which a bit sequence comprised of systematic bits and parity bits is written;
a selection section that selects one selection candidate of a plurality of selection candidates formed with read start address candidates and read direction candidates of the circular buffer, each of the plurality of selection candidates comprising at least one of a number of systematic bits yet to be transmitted, a number of critical parity bits yet to be transmitted and a number of non-critical parity bits yet to be transmitted; and
a control section that controls a read start address and a read end address in the circular buffer according to the selected one selection candidate,
wherein the selection section selects the one selection candidate, in which the number of systematic bits yet to be transmitted or the number of critical parity bits yet to be transmitted is greater than that in the other of the plurality of selection candidates.

2. The radio communication apparatus according to claim 1, wherein the selection section selects the one selection candidate in which the read direction of the circular buffer is altered between a forward direction and a backward direction according to the number of transmissions.

3. The radio communication apparatus according to claim 1, wherein, upon an even-numbered transmission, the selection section selects the one selection candidate that has a same read start address as a read start address used upon a previous odd-numbered transmission.

4. A radio communication apparatus comprising:
a circular buffer in which a bit sequence comprised of systematic bits and parity bits is written;
a selection section that selects one selection candidate of a plurality of selection candidates formed with read start address candidates and read direction candidates of the circular buffer, each of the plurality of selection candidates comprising at least one of a number of systematic bits yet to be transmitted, a number of critical parity bits yet to be transmitted and a number of non-critical parity bits yet to be transmitted; and
a control section that controls a read start address and a read end address in the circular buffer according to the selected one selection candidate,
wherein the selection section selects the one selection candidate in which (i) the number of critical parity bits yet to be transmitted, (ii) the number of systematic bits yet to be transmitted, or (iii) a sum of the number of systematic bits yet to be transmitted and the number of critical parity bits yet to be transmitted is greater than the number of non-critical parity bits yet to be transmitted.

5. A radio communication apparatus comprising:
a circular buffer in which a bit sequence comprised of systematic bits and parity bits is written;
a selection section that selects one selection candidate of a plurality of selection candidates formed with read start address candidates and read direction candidates of the circular buffer, each of the plurality of selection candidates comprising at least one of a number of systematic bits yet to be transmitted, a number of critical parity bits yet to be transmitted and a number of non-critical parity bits yet to be transmitted; and
a control section that controls a read start address and a read end address in the circular buffer according to the selected one selection candidate,
wherein, when an effective coding rate after a retransmission is higher than a threshold value, the selection section selects the one selection candidate in which the number of critical parity bits yet to be transmitted is greater than the number of systematic bits yet to be transmitted.

6. A radio communication apparatus comprising:
a circular buffer in which a bit sequence comprised of systematic bits and parity bits is written;
a selection section that selects one selection candidate of a plurality of selection candidates formed with read start address candidates and read direction candidates of the circular buffer, each of the plurality of selection candidates comprising at least one of a number of systematic bits yet to be transmitted, a number of critical parity bits yet to be transmitted and a number of non-critical parity bits yet to be transmitted; and a control section that controls a read start address and a read end address in the circular buffer according to the selected one selection candidate, wherein, when an effective coding rate after a retransmission is lower than a threshold value, the selection section selects the one selection candidate in which the number of systematic bits yet to be transmitted is greater than the number of critical parity bits yet to be transmitted.

7. A circular buffer control method comprising:

selecting one selection candidate of a plurality of selection candidates formed with read start address candidates and read direction candidates of a circular buffer in which a bit sequence comprised of systematic bits and parity bits is written, each of the plurality of selection candidates comprising at least one of a number of systematic bits yet to be transmitted, a number of critical parity bits yet to be transmitted and a number of non-critical parity bits yet to be transmitted; and controlling a read start address and a read end address in the circular buffer according to the selected one selection candidate, wherein the one selection candidate, in which the number of systematic bits yet to be transmitted or the number of critical parity bits yet to be transmitted is greater than that in the other of the plurality of selection candidates, is selected.

* * * * *